US012710525B2

(12) United States Patent
Sanson et al.

(10) Patent No.: US 12,710,525 B2
(45) Date of Patent: Aug. 18, 2026

(54) STEPPED PULSE DIGITALLY MODULATED RADAR

(71) Applicant: GM Cruise Holdings LLC, San Francisco, CA (US)

(72) Inventors: Jessica Bartholdy Sanson, Munich (DE); Gustavo Adolfo Guarín Aristizabal, Munich (DE); Andre Giere, Oberpframmern (DE); Jorge Julio Jácome Muñoz, Munich (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 523 days.

(21) Appl. No.: 17/694,628

(22) Filed: Mar. 14, 2022

(65) Prior Publication Data

US 2023/0288548 A1 Sep. 14, 2023

(30) Foreign Application Priority Data

Mar. 14, 2022 (EP) .................................... 22161892

(51) Int. Cl.
*G01S 13/02* (2006.01)
*G01S 7/35* (2006.01)
(Continued)

(52) U.S. Cl.
CPC .......... *G01S 13/0209* (2013.01); *G01S 7/356* (2021.05); *G01S 13/325* (2013.01); *G01S 13/931* (2013.01)

(58) Field of Classification Search
CPC .... G01S 13/0209; G01S 7/356; G01S 13/325; G01S 13/931
See application file for complete search history.

(56) References Cited

U.S. PATENT DOCUMENTS

2018/0074173 A1* 3/2018 Trotta ..................... G01S 7/032
2018/0088223 A1* 3/2018 Yano ......................... G01S 7/36
(Continued)

FOREIGN PATENT DOCUMENTS

EP 4246181 A1 9/2023
KR 102235571 B1 * 4/2021 ........... G01S 7/2883
(Continued)

OTHER PUBLICATIONS

17694628_2025-04-22_KR_102235571_B1_M.pdf, machine translation of KR 102235571 B1 (Year: 2021).*
(Continued)

*Primary Examiner* — William Kelleher
*Assistant Examiner* — Kenneth W Good
(74) *Attorney, Agent, or Firm* — CANTOR COLBURN LLP

(57) ABSTRACT

A radar sensor system transmits a radar signal that comprises first pulses in a first frequency band and second pulses in a second frequency band. The radar sensor system receives a return of the radar signal from a target, wherein the return comprises the first pulses and the second pulses. The radar sensor system concatenates the first pulses and the second pulses, and computes an estimated range to a target based upon a Fourier transform of the concatenated first and second pulses. A range resolution of the estimated range is based upon a bandwidth of a third frequency band that includes the first frequency band and the second frequency band.

18 Claims, 5 Drawing Sheets

(51) Int. Cl.
*G01S 13/32* (2006.01)
*G01S 13/931* (2020.01)

(56) References Cited

U.S. PATENT DOCUMENTS

2019/0319722 A1* 10/2019 Yu .......................... G01S 13/84
2020/0233076 A1* 7/2020 Chen .................... G01S 13/584
2020/0278430 A1* 9/2020 Zhu ........................ G01S 7/487
2021/0389452 A1* 12/2021 Lau ...................... G01S 13/347
2021/0405183 A1* 12/2021 Vossiek ................ G01S 13/003
2023/0236288 A1* 7/2023 Vollbracht ............. G01S 13/42
342/70

FOREIGN PATENT DOCUMENTS

WO 2005033728 A3 4/2005
WO WO-2005033728 A2 * 4/2005 ......... G01S 13/0209

OTHER PUBLICATIONS

"Extended European Search Report for European Patent Application No. 22161892.9", Mailed Date: Sep. 2, 2022, 9 pages.
Yu, et al., "Multiband Chirp Synthesis for Frequency-Hopped FMCW Radar", In 2009 Conference Record of the Forty-Third Asilomar Conference on Signals, Systems, and Computers, Nov. 1, 2009, pp. 1315-1319.

* cited by examiner

STEPPED PULSE DIGITALLY MODULATED RADAR

RELATED APPLICATIONS

This application claims priority to European Patent Application No. EP22161892.9, filed on Mar. 14, 2022, and entitled "STEPPED PULSE DIGITALLY MODULATED RADAR." The entirety of this application is incorporated herein by reference.

BACKGROUND

Range resolution of a radar sensor is a function of the bandwidth of a radar signal transmitted by the radar sensor. All else being equal, achieving a finer range resolution generally requires a wider bandwidth signal to be transmitted by the radar sensor. In some applications, such as automotive radar for collision detection and navigation, it may be desirable to achieve range resolution on the order of less than 10 centimeters. For some applications, achieving the desired range resolution requires a conventional radar sensor to transmit radar signals with a bandwidth greater than 1 gigahertz (GHz).

Whereas transmitting a radar signal with a large bandwidth (e.g., greater than 1 GHz) can allow a radar sensor to achieve a target range resolution, digitally sampling such a radar signal without aliasing requires analog-to-digital converters (ADCs) with sampling rates of several GHz. Furthermore, radar sensors that employ digital pulse modulation for preparing radar signals for transmission also require digital-to-analog converters (DACs) with sampling rates of several GHz. ADCs and DACs with sample rates of 1 GHz or greater generally require greater area on an integrated circuit and have higher power consumption than ADCs and DACs with lower sample rates. As a result, radar sensors that employ large bandwidth, digitally modulated radar signals have conventionally been bulky and had high power consumption.

SUMMARY

The following is a brief summary of subject matter that is described in greater detail herein. This summary is not intended to be limiting as to the scope of the claims.

Described herein are various technologies relating to radar sensors with improved range resolution. With more particularity, various technologies described herein facilitate generating radar-based range estimates to a target based upon a stepped series of pulse sequences that collectively have a bandwidth greater than a bandwidth of the individual sequences. A radar sensor is configured to transmit a radar signal toward a target. The radar signal is a digitally modulated radar signal. In a non-limiting example, the digitally modulated radar signal is a phase-modulated continuous wave (PMCW) radar signal. The digitally modulated radar signal can comprise first pulses that are defined by a first frequency band and second pulses that are defined by a second frequency band. The first frequency band and the second frequency band are different and at least partially overlap. As is described in greater detail below, the first frequency band and the second frequency band can be selected based upon a desired range resolution of range estimates generated by the radar sensor. The first frequency band and the second frequency band can further be selected based upon a maximum sampling frequency of DACs and ADCs employed in connection with preparing pulses that are transmitted by the radar sensor and sampling pulses that are received by the radar sensor, respectively. For instance, the first frequency band and the second frequency band can be selected to have bandwidths less than or equal to the maximum sampling frequency of the DACs and ADCs, so that the Nyquist-Shannon criterion remains satisfied.

The radar sensor receives a return from the target, the return comprising a reflection of the radar signal from the target. Thus, the return comprises the reflected first and second pulses. The radar sensor applies respective matched filters to the first pulses and the second pulses to determine a phase difference between the first and second pulses as transmitted by the radar sensor, and the first and second pulses as received by the radar sensor. The radar sensor concatenates the match-filtered first pulses and second pulses in the frequency domain. The radar sensor computes an estimated range to the target based upon the concatenated first and second pulses collectively. A resolution of the estimated range is a function of a bandwidth that is at least as large as the joint bandwidth of the first pulses and the second pulses (i.e., the bandwidth between a lowest frequency and a highest frequency present in the first pulses and the second pulses).

It is to be appreciated that while various aspects are described above with respect to first pulses and second pulses, a number of groups of pulses transmitted by the radar sensor in a single pulse repetition interval (PRI) can be other than two. In exemplary embodiments, a number of groups of pulses transmitted by the radar sensor in a single PRI can be selected based upon a desired joint bandwidth of the groups of pulses and a maximum sampling frequency of DACs and ADCs employed by the radar sensor for preparing and sampling radar signals. In a non-limiting illustrative example, if a desired joint bandwidth of the groups of pulses is 1 GHz and the maximum sampling frequency of DACs and ADCs employed by the radar sensor is 200 MHz, the radar sensor can be configured to transmit at least 5 groups of pulses in a single PRI, wherein the groups of pulses each have a bandwidth of 200 MHz, in order to satisfy the Nyquist-Shannon criterion.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to a radar sensor with improved range resolution are described herein. With more particularity, technologies described herein relate to a radar sensor that computes an estimated range to a target with a resolution that is limited by a bandwidth greater than an instantaneous bandwidth of a radar signal at any given time. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 1:
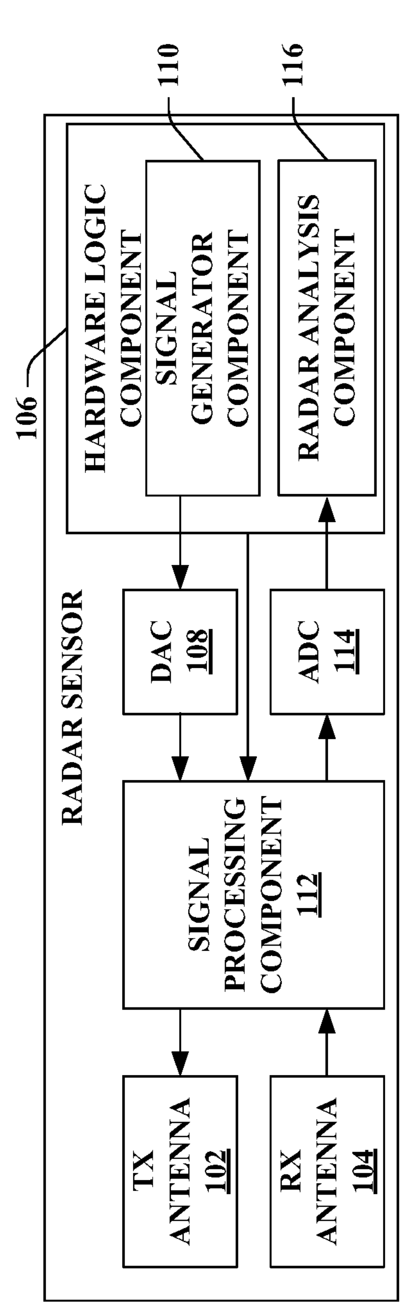
FIG. 1 is a functional block diagram of an exemplary radar sensor.

With reference now to FIG. 1, an exemplary radar sensor 100 is illustrated. The radar sensor 100 includes a transmit antenna 102, a receive antenna 104, and a hardware logic component 106. Briefly, the hardware logic component 106 is configured to prepare radar signals that are transmitted by the transmit antenna 102, and to compute target solutions indicating estimated positions and/or velocities of objects based upon radar returns received by the receive antenna 104. In exemplary embodiments, various components of the radar sensor 100 can be integrated as a same system-on-a-chip (SoC). In various embodiments, the radar sensor 100 can be employed on a vehicle, such as a land vehicle, an aircraft, to identify positions and velocities of objects in the operational environment of the vehicle.

The radar sensor 100 further comprises a DAC 108. The hardware logic component 106 comprises a signal generator component 110 that prepares radar signals for transmission by way of the transmit antenna 102. The signal generator component 110 is configured to control the DAC 108 to cause the DAC 108 to generate an analog radar signal for transmission by the transmit antenna 102. In other words, the signal generator component 110 generates digital values that, when received by the DAC 108, cause the DAC 108 to output an analog radar signal having various desired signal characteristics. Hence, the radar sensor 100 is configured as a digitally modulated radar sensor, wherein characteristics of radar signals output by the transmit antenna 102 are digitally controlled by the signal generator component 110 of the hardware logic component 106. For example, the signal generator component 110 can be configured to control the DAC 108 such that the radar sensor operates as a PMCW radar sensor.

The radar sensor 100 further includes an analog signal processing component 112. The signal processing component 112 is generally configured to perform various analog signal processing operations on analog signals that are to be output by the transmit antenna 102 and/or that are received by the receive antenna 104. By way of example, and not limitation, the signal processing component 112 can amplify a radar signal output by the DAC 108 to increase the power of the radar signal prior to transmission by way of the transmit antenna 102. In a further example, the signal processing component 112 can be configured to mix a radar signal output by the DAC 108 with a carrier signal to shift a center frequency of the radar signal. The signal processing component 112 can include any of various components that are configured to perform these various functions. For example, the signal processing component 112 can include mixers, amplifiers, filters, or the like. Functionality of the signal processing component 112 and its constituent components can be controlled by the hardware logic component 106. For example, and as will be described in greater detail below, the signal generator component 110 can control operation of the signal processing component 112 to cause the signal processing component 112 to shift center frequencies of radar pulse sequences output by the DAC 108. The transmit antenna 102 receives processed radar signals from the signal processing component 112 and emits the radar signals into an operational environment of the radar sensor 100.

The receive antenna 104 receives radar returns from the operational environment. In exemplary embodiments, the radar returns received by the receive antenna 104 comprise reflections, from objects in the operational environment of the sensor 100, of radar signals emitted by the transmit antenna 102. It is to be understood that the radar returns received by the receive antenna 104 can further include reflections of radar signals emitted by other radar emitters that are active within the operational environment of the radar sensor 100. As will be described in greater detail below, the technologies described herein can reduce the likelihood of interference among multiple radar sensors operating within the same operational environment. Responsive to receipt of radar returns from the operational environment of the sensor 100, the receive antenna 104 outputs an electrical signal that is indicative of the received radar returns. This electrical signal is referred to herein as a radar signal and is transmitted along one or more transmission lines in the radar sensor 100, as distinct from radar returns that are received by the receive antenna 104 as radiated signals propagating through air or free space in the operational environment of the radar sensor 100.

The signal processing component 112 receives a radar signal from the receive antenna 104. The signal processing component 112 is configured to perform various analog signal processing operations over radar signals received from the receive antenna 104. By way of example, and not limitation, the signal processing component 112 can perform various mixing, filtering, and amplification operations on radar signals output by the receive antenna 104. The signal processing component 112 can be configured to perform various of these signal processing operations (e.g., mixing) based further upon a radar signal transmitted by the transmit antenna 102.

The radar sensor 100 further comprises an ADC 114 that receives a processed radar signal from the signal processing component 112. The ADC 114 digitally samples the radar signal and outputs digital values that are indicative of amplitude of the radar signal over time. These digital values are collectively referred to herein as radar data. The radar data output by the ADC 114 are indicative of the radar returns received by the receive antenna 104.

The hardware logic component 106 receives the radar data from the ADC 114. The hardware logic component 106 further comprises a radar analysis component 116. The radar analysis component 116 is configured to compute positions and/or velocities of targets in the operational environment of the radar sensor 100 based upon the radar data. In a non-limiting example, the radar analysis component 116 can compute a range, a bearing, and/or a velocity of a target in the operational environment of the sensor 100 based upon the radar data.

Various exemplary operations of the radar sensor 100 are set forth below. As indicated above, the range resolution of a conventional radar sensor (i.e., a minimum difference in range between two objects that is unambiguously distinguishable by the radar sensor) is limited by the bandwidth of a radar signal emitted by the radar sensor. The range resolution, $S_r$, of a radar sensor is conventionally given by:

$$S_r = \frac{c}{2B} \quad \text{Eq. 1}$$

where $S_r$ is the minimum difference in range between two objects that is unambiguously distinguishable by the radar sensor, c is the speed of light in the medium through which the radar signal emitted by the radar sensor is propagating, and B is the bandwidth of the radar signal. Hence, for a conventional radar sensor to achieve a range resolution of 7.5 centimeters, the conventional radar sensor emits a radar signal having a bandwidth of about 2 GHz.

A digitally modulated radar sensor, such as the radar sensor 100, generally employs DACs and ADCs that have a sampling frequency greater than or equal to the bandwidth of a complex-valued radar signal emitted by the sensor, in order to ensure that the Nyquist-Shannon sampling criterion is satisfied. Thus, a conventional digitally modulated radar sensor designed to achieve a 7.5-centimeter range resolution would employ DACs and ADCs with a sampling rate of at least 2 gigasamples per second (GS/s). However, the size-on-chip and power consumption of DACs and ADCs tends to increase as the sampling rate increases. High-speed DACs and ADCs are prohibitively large and power-consumptive to be used in a radar sensor employed for certain applications (e.g., automotive radar sensors).

The radar sensor 100 is configured to emit sequences of radar pulses that, over a PRI, collectively cover a bandwidth that is greater than a bandwidth of any of the individual pulses. In other words, the radar pulses emitted by the radar sensor 100 (by way of the transmit antenna 102) each have a smaller individual pulse bandwidth than a total repetition interval bandwidth that extends from a lowest frequency component in the radar pulses to a highest frequency component in the radar pulses. Hence, the DAC 108 of the radar sensor 100 can prepare a radar signal for transmission by way of the transmit antenna 102 while operating at a sampling rate below the total collective bandwidth of the pulses in a PRI.

The radar sensor 100 is further configured to compute an estimate of a range to a target based upon the pulses of a PRI collectively. The ADC 114 samples each of the pulses of a radar return at a sampling rate that is greater than or equal to the individual pulse bandwidth, but that is less than the total repetition interval bandwidth. The radar analysis component 116, based upon the sampled values of the radar return over a PRI, computes the estimate of the range to the target with a resolution that is limited by the bandwidth of the PRI rather than the individual pulse bandwidth. In other words, the range resolution $S_r$ of the range estimate output by the radar sensor 100 is given by the following Eq. 2:

$$S_r \geq \frac{c}{2B_{PRI}} \quad \text{Eq. 2}$$

where $B_{PRI}$ is the collective bandwidth of the pulse sequences in the PRI, rather than Eq. 3:

$$S_r \geq \frac{c}{2B_{pulse}} \quad \text{Eq. 3}$$

where $B_{pulse}$ is the bandwidth of the individual pulse sequences.

Figure 2:
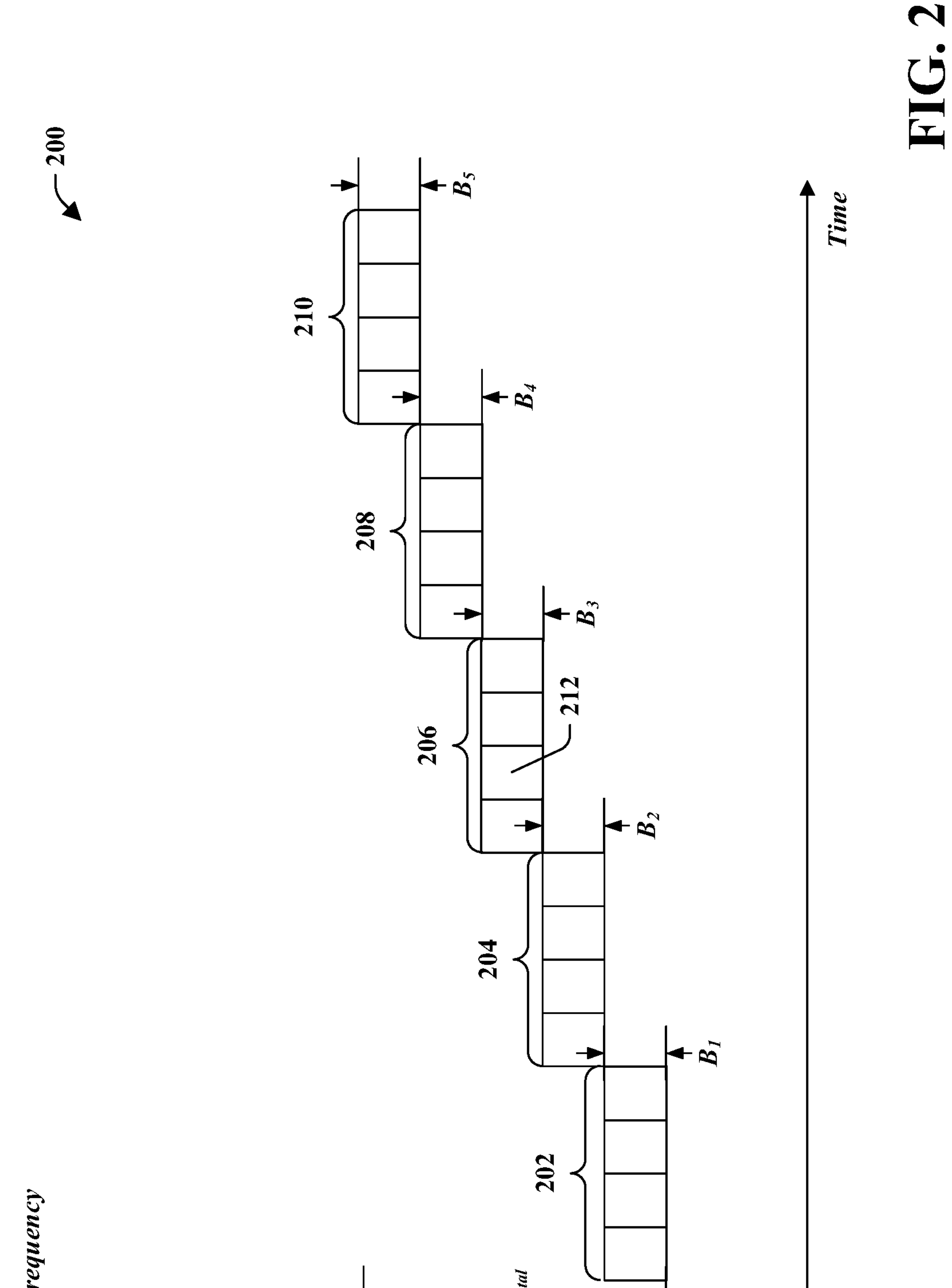
FIG. 2 is a frequency-versus-time plot of an exemplary PRI.

By way of further illustration, referring now to FIG. 2, an exemplary plot 200 of a radar PRI is shown, with signal frequency plotted against time. As used herein with respect to the radar sensor 100, pulses can refer to segments of a radar signal that is transmitted as a continuous wave signal, wherein the segments are individually representative of symbols encoded on the continuous wave signal. By way of example, in embodiments wherein the radar sensor 100 is configured as a PMCW radar sensor, a pulse can refer to a portion of the radar signal that represents a single digital value encoded on a phase of the carrier of the radar signal.

The plot 200 includes a plurality of pulse sequences 202-210. Each of the pulse sequences 202-210 includes a respective plurality of pulses (e.g., a pulse 212 in the third sequence 206). Collectively, the sequences 202-210 extend across a total bandwidth $B_{total}$ that is the sum of their respective individual bandwidths $B_1$, $B_2$, $B_3$, $B_4$, $B_5$. Each of the sequences 202-210 of pulses has a different center frequency. In exemplary embodiments, each of the sequences 202-210 can have a same individual pulse bandwidth. In other words, in various embodiments the bandwidths $B_1$, $B_2$, $B_3$, $B_4$, $B_5$ are approximately equal. It is to be understood that while the pulse sequences 202-210 are shown as being transmitted in increasing order of center frequency, the pulse sequences 202-210 can be transmitted in substantially any order. For example, the radar sensor 100 can be configured to transmit the pulse sequences 202-210 in a random order, or a pseudo-random order. In other embodiments, the radar sensor 100 can be configured to transmit the pulse sequences 202-210 in order of decreasing center frequency.

Referring again to FIG. 1, the signal generator component 110 prepares a radar signal that comprises a plurality of pulse sequences by controlling operation of the DAC 108 and the signal processing component 112. The signal generator component 110 can prepare the radar signal to have substantially any number of pulse sequences. In various embodiments, the signal generator component 110 can prepare the radar signal such that the sequences each have a predefined number of pulses. In a non-limiting example, each of the sequences comprises a Barker code. In these embodiments, the signal generator component 110 prepares the radar signal such that each of the sequences includes 2, 3, 4, 5, 7, 11, or 13 pulses. However, each of the pulse sequences can have substantially any number of pulses, and the sequences can be encoded according to substantially any code.

The signal generator component 110 prepares the radar signal such that each pulse sequence in a PRI covers a different portion of a total bandwidth of the PRI. For example, the signal generator component 110 prepares the radar signal such that each pulse sequence in a PRI has a different center frequency. In an exemplary embodiment, the signal generator component 110 outputs a digital representation of a first pulse sequence to the DAC 108. The first pulse sequence has a first bandwidth. The DAC 108 outputs a first analog signal that comprises the first pulse sequence to the signal processing component 112. The signal generator component 110 controls at least one of the DAC 108 or the signal processing component 112 to shift a center frequency of the first analog signal. For instance, the signal generator component 110 can control a frequency of a carrier signal that the signal processing component 112 mixes with the first analog signal to shift the first analog signal to a first center frequency. In other embodiments, the signal generator component 110 can control the DAC 108 to directly impart a desired center frequency to the first analog signal (i.e., such that the first analog signal has the first center frequency when output by the DAC 108).

Similarly, the signal generator component 110 can output a digital representation of a second pulse sequence to the DAC 108, wherein the second pulse sequence has a same first bandwidth as the first pulse sequence. Responsive to receipt of the second pulse sequence, the DAC 108 outputs a second analog signal that comprises the second pulse sequence to the signal processing component 112. The signal generator component 110 causes at least one of the DAC 108 or the signal processing component 112 to impart a second center frequency of the second analog signal. Continuing the examples above, the signal generator component 110 can control the frequency of a carrier signal that the signal processing component 112 mixes with the second analog signal to shift the second analog signal to a second center frequency that is different from the first center frequency. In other embodiments, the signal generator component 110 controls the DAC 108 to directly impart the second center frequency to the first analog signal. Hence, a radar signal output by the signal processing component 112 and transmitted by way of the transmit antenna 102 includes the first pulse sequence in a first frequency band and the second pulse sequence in a second frequency band, where the first frequency band the second frequency band are different.

In still further embodiments, the radar sensor 100 can include a plurality of transmit antennas that are each configured to transmit radar signals in a different frequency band. In these embodiments, the DAC 108 and the signal processing component 112 can be configured to selectively transmit radar signals by way of a different antenna in the plurality of transmit antennas based upon the center frequencies of the radar signals. By way of example, and not limitation, a radar sensor can include a first transmit antenna (e.g., the transmit antenna 102) and a second transmit antenna (not shown). The DAC 108 and the signal processing component 112 are configured to output a first pulse sequence in a first frequency band by way of the first transmit antenna, and to output a second pulse sequence in a second frequency band by way of the second transmit antenna. In these embodiments, the signal generator component 110 can be configured to control the DAC 108 and the signal processing component 112 such that radar signals are transmitted by way of the multiple transmit antennas sequentially. In other words, the signal generator component 110 can control the DAC 108 and the signal processing component 112 such that radar signals are transmitted in only one frequency band at a time.

In exemplary embodiments, the signal generator component 110 prepares the pulse sequences such that within a same pulse sequence, each of the pulses has a same bandwidth and a same center frequency. In various embodiments, each of the pulse sequences can have a same bandwidth centered about a different center frequency. In other embodiments, each of the pulse sequences can have a different bandwidth. The signal generator component 110 prepares the radar signal such that the bandwidths of the pulse sequences of a PRI are contiguous across the total bandwidth of the PRI. In other words, there are no bandwidth gaps between the bandwidths of the pulse sequences across the total bandwidth of the PRI. It is to be appreciated that in some embodiments, there may be some overlap between the bandwidths of the pulse sequences of the radar signal.

Bandwidths of the pulse sequences and/or a number of the pulse sequences can be selected based upon a sampling rate of the DAC 108 and/or ADC 114 and a desired range resolution of the radar sensor 100. In an exemplary embodiment, a total bandwidth of the PRI required for a given application can be determined according to Eq. 2 based upon the desired range resolution of the radar sensor 100. Bandwidths of the pulse sequences can be selected to be less than or equal to the sampling rates of the DAC 108 and the ADC 114 to ensure that the Nyquist-Shannon sampling criterion is satisfied. A product of the bandwidth of the pulse sequences and a number of the pulse sequences can be selected to be approximately equal to the total bandwidth of the PRI. In a non-limiting example, the DAC 108 and the ADC 114 can have sampling rates of less than or equal to 1 GS/s, the bandwidths of the pulse sequences can be less than or equal to 500 MHz, and a desired range resolution can be less than or equal to 7.5 centimeters. In such example, the total bandwidth of a PRI can be greater than or equal to 2 GHz, and a number of the pulse sequences can be determined by dividing the PRI bandwidth by the selected bandwidth of the pulse sequences. For instance, each PRI can comprise 4 pulse sequences each having a bandwidth of 500 MHz, 5 pulse sequences each having a bandwidth of 400 MHz, 10 pulse sequences each having a bandwidth of 200 MHz, etc. In another example, the DAC 108 and the ADC 114 can have sampling rates of less than or equal to 500 MS/s, the bandwidths of the pulse sequences can be less than or equal to 250 MHz, and a desired range resolution of the radar sensor 100 can be less than or equal to 15 centimeters. In this example, the total bandwidth of a PRI can be greater than or equal to 1 GHz. Continuing the example, each PRI can comprise 4 pulse sequences each having a bandwidth of 250 MHz, 5 pulse sequences each having a bandwidth of 200 MHz, 10 pulse sequences each having a bandwidth of 100 MHz, etc.

In response to receipt of a digital radar signal from the signal generator component 110 prepared as described above, the DAC 108 outputs an analog radar signal that comprises a plurality of pulse sequences. The signal generator component 110 can control at least one of the DAC 108 or the signal processing component 112 to shift the center frequencies of the pulse sequences such that the pulse sequences collectively cover the total bandwidth of the PRI. The signal processing component 112 outputs the radar signal comprising the frequency-shifted pulse sequences to the transmit antenna 102. The transmit antenna 102 emits the radar signal into the operational environment of the radar sensor 100 (e.g., toward a target present in the operational environment).

The receive antenna 104 receives a radar return from the operational environment, wherein the radar return comprises a reflection of the radar signal from a target in the operational environment of the sensor 100. Thus, the radar return comprises reflected pulse sequences. For the sake of simplicity, in the description that follows the radar return will be described as comprising the same pulse sequences present in the radar signal transmitted by the transmit antenna 102. However, it is to be understood that the pulse sequences present in the radar signal can be distorted by various environmental effects, interaction with objects in the operational environment of the sensor 100, interference, etc., and that the reflected pulse sequences present in the radar return may be based upon, but not identical to, pulse sequences present in the radar signal transmitted by the transmit antenna 102.

The signal processing component 112 receives a return radar signal from the receive antenna 104. The return radar signal is an electrical signal output by the receive antenna 104 responsive to receipt of the radar return from the operational environment of the radar sensor 100. The signal processing component 112 receives the return radar signal, which comprises the pulse sequences. The signal processing component 112 shifts the center frequency of the pulse sequences down to a baseband center frequency. It is to be understood that if a received pulse sequence has a same center frequency as the baseband center frequency, the signal processing component 112 need not shift the center frequency of that pulse sequence to the baseband center frequency. The ADC 114 receives the baseband-shifted pulse sequences and digitally samples the pulse sequences to generate radar data. The ADC 114 outputs the radar data to the radar analysis component 116.

The radar analysis component 116 computes a range estimate to a target in the operational environment of the sensor 100 based upon a portion of the radar data that is representative of a single PRI. In exemplary embodiments, the radar analysis component 116 applies a respective matched filter to each of the received pulse sequences in the PRI. Since each of the pulse sequences generated by the signal generator component 110 can be encoded by a different modulation signal, each of the pulse sequences in a PRI can be different. Hence, the radar analysis component 116 can apply a different matched filter to each of the pulse sequences in the PRI. Applying the matched filters to the pulse sequences of the PRI allows the radar analysis component 116 to identify the pulse sequences in the radar data and to determine a phase difference between the pulse sequences as transmitted by the transmit antenna 102 and as received by the receive antenna 104. Furthermore, filtering operations can improve an SNR of the pulse sequences in the radar data. However, it is to be understood that in some embodiments, the radar analysis component 116 does not apply a matched filter to pulse sequences in the radar data. For example, the radar analysis component 116 can apply any or a combination of low-pass filters, high-pass filters, bandpass filters, or the like to the pulse sequences. In still other embodiments, filtering of the radar data pertaining to the pulse sequences of a PRI can be omitted.

The radar analysis component 116 concatenates the pulse sequences of a PRI in the frequency domain. By way of example, the radar analysis component 116 can identify first samples in the radar data that are representative of a first pulse sequence and second samples in the radar data that are representative of a second pulse sequence. If the first samples and the second samples are time-domain values, the radar analysis component 116 can compute respective FFTs over the first samples and the second samples to generate frequency-domain representations of the received first and second pulse sequences. In other words, the radar analysis component 116 can compute an FFT over the first samples to generate first frequency-domain data that represents the first pulse sequence. The radar analysis component 116 can compute an FFT over the second samples to generate second frequency-domain data that represents the second pulse sequence. Continuing the example, the radar analysis component 116 concatenates the first pulse sequence and the second pulse sequence by concatenating the first frequency-domain data and the second frequency-domain data. The concatenated sequences therefore comprise a set of complex values that are each representative of magnitude and phase of different frequency components present in the radar return over the PRI.

The radar analysis component 116 computes an estimated range to a target in the operational environment of the sensor 100 based upon the concatenated pulse sequences. In an exemplary embodiment, the radar analysis component 116 further concatenates frequency domain representations of the pulse sequences transmitted by the transmit antenna 102. The radar analysis component 116 multiplies the concatenated received pulse sequences by the concatenated transmitted pulse sequences in the frequency domain. The radar analysis component 116 can then compute an inverse FFT (IFFT) over the product of the two sets of concatenated pulse sequences. The radar analysis component 116 can compute the estimated range based upon phase or frequency shifts between the transmitted pulse sequences and the received pulse sequences in the PRI, as indicated by the IFFT of the concatenated pulse sequences. A range resolution of the estimated range computed by the radar analysis component 116 is limited by the total bandwidth covered by the concatenated pulse sequences, rather than the individual bandwidths of the pulse sequences. For example, referring briefly once again to FIG. 2, the range resolution of an estimated range computed based upon the concatenated frequency-domain representations of the sequences 202-210 is limited by the total bandwidth $B_{total}$ rather than any of the individual bandwidths $B_1$, $B_2$, $B_3$, $B_4$, $B_5$.

Responsive to computing the estimated range to the target, the radar analysis component 116 outputs the estimated range. For example, as described in greater detail below, the radar analysis component 116 can output the estimated range to a perception system of an autonomous vehicle that is configured to navigate based in part upon output of the radar sensor 100.

The radar sensor 100 is configured to repeatedly, or continuously, transmit pulse sequences by way of the transmit antenna 102, and to repeatedly or continuously receive radar returns that comprise reflections of the pulse sequences by way of the receive antenna 104. The radar analysis component 116 can be configured to compute a successive estimate for each successively received PRI. In other words, the radar sensor 100 can transmit first pulse sequences in a first PRI and second pulse sequences in a second PRI.

Responsive to receipt of a first return that comprises the first sequences at the radar sensor 100, the radar analysis component 116 computes a first estimated range to a target based upon the first sequences of the first PRI. Responsive to receipt of a second return that comprises the second sequences at the radar sensor 100, the radar analysis component 116 computes a second estimated range to the target based upon the second sequences of the second PRI.

Figure 3:
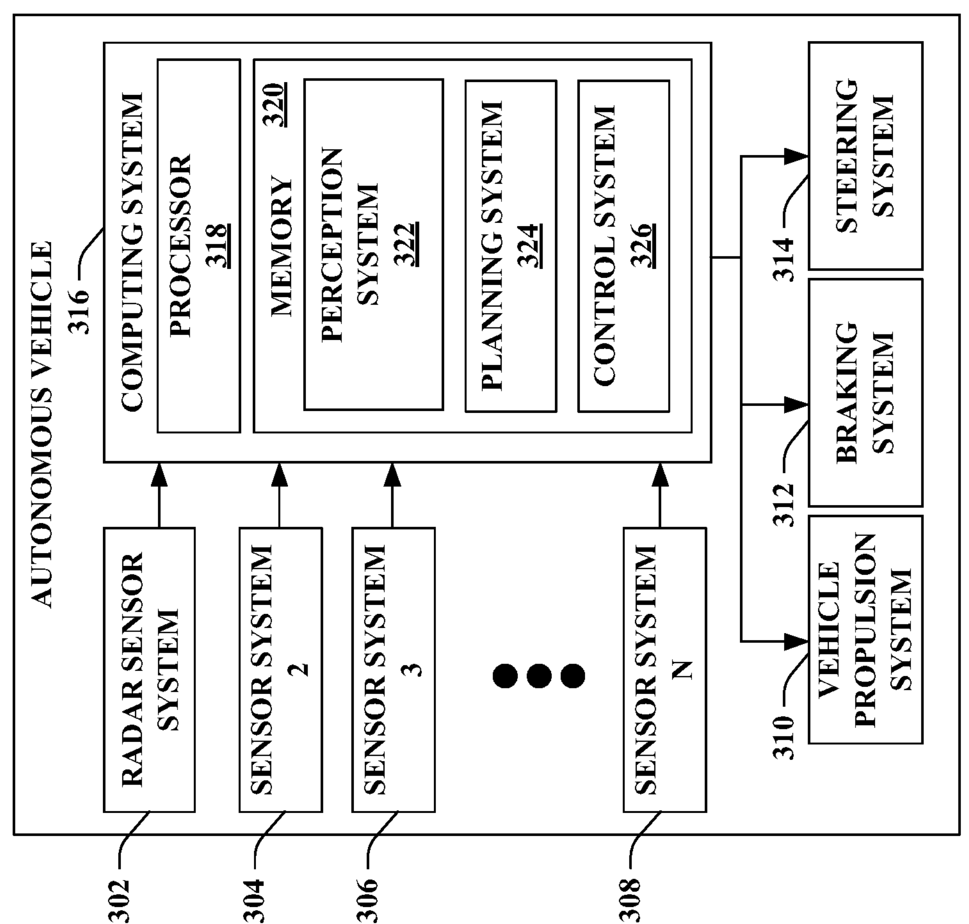
FIG. 3 is a functional block diagram of an exemplary AV.
Figure 3:

Various technologies described herein are suitable for use in connection with an autonomous vehicle (AV) that employs a radar system to facilitate navigation about roadways. Referring now to FIG. 3, an exemplary AV 300 is illustrated, wherein the AV 300 can navigate about roadways without human conduction based upon sensor signals output by sensor systems of the AV 300. The AV 300 includes a plurality of sensor systems 302-308 (a first sensor system 302 through an Nth sensor system 308). The sensor systems 302-308 may be of different types. For example, the first sensor system 302 is a radar sensor system, the second sensor system 304 may be a lidar sensor system, the third sensor system 306 may be a camera (image) system, and the Nth sensor system 308 may be a sonar system. Other exemplary sensor systems include GPS sensor systems, inertial sensor systems, infrared sensor systems, and the like. The various sensor systems 302-308 are arranged about the AV 300. The sensor systems 302-308 are configured to repeatedly (e.g. continuously, or periodically) output sensor data that is representative of objects and conditions in the driving environment of the AV 300.

The AV 300 further includes several mechanical systems that are used to effectuate appropriate motion of the AV 300. For instance, the mechanical systems can include but are not limited to, a vehicle propulsion system 310, a braking system 312, and a steering system 314. The vehicle propulsion system 310 may be an electric engine, an internal combustion engine, or a combination thereof. The braking system 312 can include an engine brake, brake pads, actuators, a regenerative braking system, and/or any other suitable componentry that is configured to assist in decelerating the AV 300. The steering system 314 includes suitable componentry that is configured to control the direction of movement of the AV 300.

The AV 300 additionally comprises a computing system 316 that is in communication with the sensor systems 302-308 and is further in communication with the vehicle propulsion system 310, the braking system 312, and the steering system 314. The computing system 316 includes a processor 318 and memory 320 that includes computer-executable instructions that are executed by the processor 318. In an example, the processor 318 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 320 comprises a perception system 322, a planning system 324, and a control system 326. Briefly, the perception system 322 is configured to identify the presence of objects and/or characteristics of objects in the driving environment of the AV 300 based upon sensor data output by the sensor systems 302-308. The planning system 324 is configured to plan a route and/or a maneuver of the AV 300 based upon data pertaining to objects in the driving environment that are output by the perception system 322. The control system 326 is configured to control the mechanical systems 310-314 of the AV 300 to effectuate appropriate motion to cause the AV 300 to execute a maneuver planned by the planning system 324.

The perception system 322 is configured to identify objects in proximity to the AV 300 that are captured in sensor signals output by the sensor systems 302-308. By way of example, the perception system 322 can be configured to identify the presence of an object in the driving environment of the AV 300 based upon images generated by a camera system included in the sensor systems 304-308. In another example, the perception system 322 can be configured to determine a presence and position of an object based upon radar data output by the radar sensor system 302. In exemplary embodiments, the radar sensor system 302 can be or include the radar sensor 100. In such embodiments, the perception system 322 can be configured to identify a position of an object in the driving environment of the AV 300 based upon the estimated range output by the radar sensor 100.

The AV 300 can be included in a fleet of AVs that are in communication with a common server computing system. In these embodiments, the server computing system can control the fleet of AVs such that radar sensor systems of AVs operating in a same driving environment (e.g., within line of sight of one another, or within a threshold distance of one another) employ different pulse sequence carrier frequencies. In an exemplary embodiment, a radar sensor system of a first AV can be controlled so as not to transmit pulse sequences having same center frequencies as pulse sequences transmitted by a radar sensor system of a second AV at the same time. In further embodiments, the radar sensor system of the first AV can be controlled to transmit pulse sequences in a different order than a radar sensor system of a second AV. For instance, the radar sensor system of the first AV can be configured to transmit a set of pulse sequences at four different center frequencies A, B, C, and D in an order A, B, C, D. The radar sensor system of the second AV can be configured to transmit pulse sequences using a same set of center frequencies in a frequency order B, A, D, C. Such configurations can mitigate the effects of interference when multiple AVs that employ radar sensor systems are operating in a same driving environment.

Figure 4:
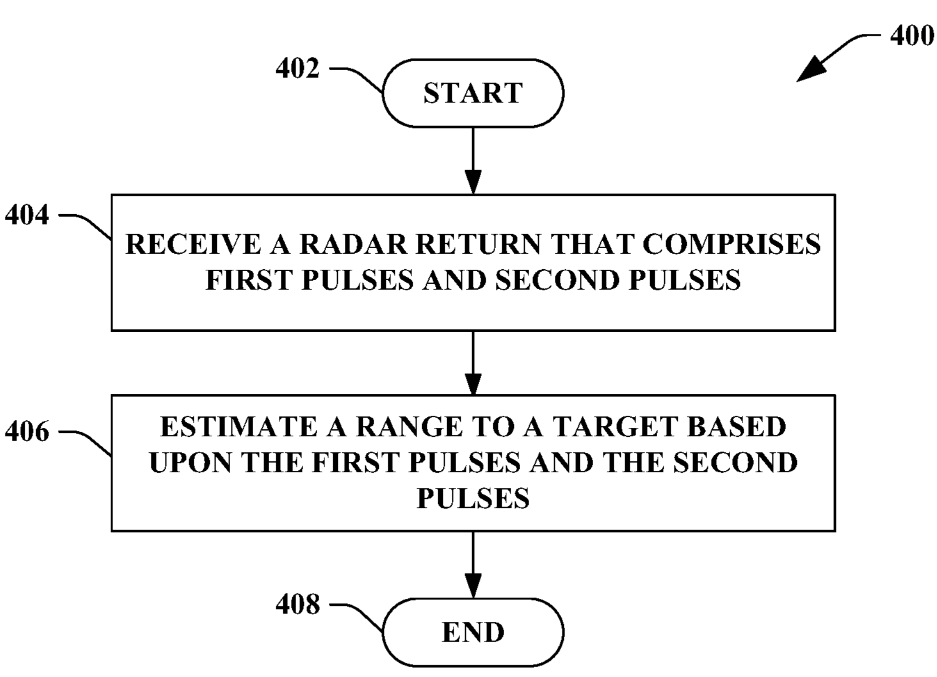
FIG. 4 is a flow diagram that illustrates an exemplary methodology for computing an estimated range to a target based upon a PRI that comprises stepped pulse sequences.

FIG. 4 illustrates an exemplary methodology relating to radar-based range estimation. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Referring now to FIG. 4, a methodology 400 that facilitates radar range estimation based upon stepped pulse sequences is illustrated. The methodology 400 begins at 402 and at 404, a radar return that comprises first pulses and second pulses is received. The first pulses and the second pulses are received at different times (e.g., due to being transmitted at different times by a transmitter). The first pulses lie within a first frequency band. The second pulses lie within a second frequency band that is different from the first frequency band. In an exemplary embodiment, the first frequency band and the second frequency band have a same bandwidth but different center frequencies. The first frequency band and the second frequency band can be adjacent or partially overlapping such that, over time, the first frequency band and the second frequency band extend across a total bandwidth of a third frequency band that includes the first frequency band and the second frequency band. At 406, an estimated range to a target is computed. The estimated range has a resolution that is limited by the total bandwidth of the third frequency band, rather than by bandwidths of the first and second frequency bands. At 408, the methodology 400 ends.

Figure 5:
FIG. 5 is an exemplary computing system.
Figure 5:
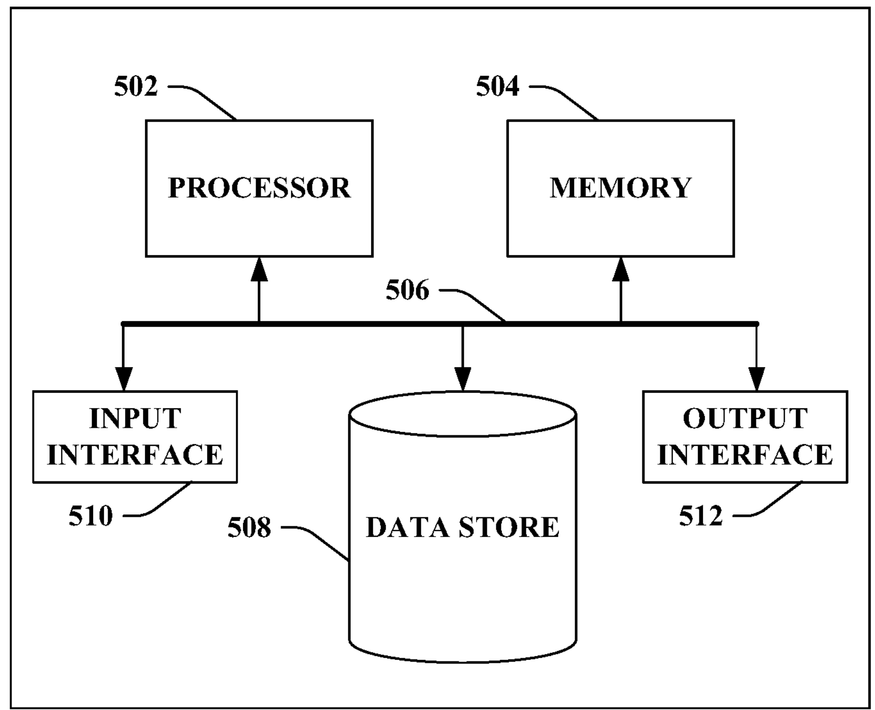

Referring now to FIG. 5, a high-level illustration of an exemplary computing device 500 that can be used in accordance with the systems and methodologies disclosed herein is illustrated. For instance, the computing device 500 may be or include the computing system 316. The computing device 500 includes at least one processor 502 that executes instructions that are stored in a memory 504. The instructions may be, for instance, instructions for implementing functionality described as being carried out by one or more modules, components, or systems discussed above or instructions for implementing one or more of the methods described above. The processor 502 may be a GPU, a plurality of GPUs, a CPU, a plurality of CPUs, a multi-core processor, etc. The processor 502 may access the memory 504 by way of a system bus 506. In addition to storing executable instructions, the memory 504 may also store radar data, beamformed radar data, neural network configurations, etc.

The computing device 500 additionally includes a data store 508 that is accessible by the processor 502 by way of the system bus 506. The data store 508 may include executable instructions, radar data, beamformed radar data, embeddings of these data in latent spaces, etc. The computing device 500 also includes an input interface 510 that allows external devices to communicate with the computing device 500. For instance, the input interface 510 may be used to receive instructions from an external computing device, etc. The computing device 500 also includes an output interface 512 that interfaces the computing device 500 with one or more external devices. For example, the computing device 500 may transmit control signals to the vehicle propulsion system 310, the braking system 312, and/or the steering system 314 by way of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), SOCs, Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a radar system, the method comprising:

transmitting a radar signal toward a target, the radar signal comprising a first sequence of first pulses transmitted via a first transmit antenna within a first frequency band and a second sequence of second pulses transmitted via a second transmit antenna within a second frequency band;

receiving a radar return from the target, the radar return comprising:

the first sequence of first pulses within the first frequency band, wherein the first pulses in the first sequence are encoded according to a first Barker code; and the second sequence of second pulses within the second frequency band, wherein the second pulses in the second sequence are encoded according to a second Barker code, wherein the second pulses in the second sequence are received at different times as compared to the first pulses in the first sequence, and wherein the second frequency band is different from the first frequency band;

concatenating a frequency domain representation of the first sequence of first pulses and a frequency domain representation of the second sequence of second pulses to generate a concatenated pulse sequence; computing an estimated range to the target based upon the first sequence of first pulses and the second sequence of second pulses, wherein the estimated range has a resolution that is based upon bandwidth of a third frequency band that includes the first frequency band and the second frequency band, wherein computing the estimated range comprises computing an inverse fast Fourier transform (IFFT) over the concatenated pulse sequence, wherein computing the estimated range is based upon the IFFT; and navigating an autonomous vehicle based in part on the estimated range, wherein the autonomous vehicle is a first autonomous vehicle operating within a threshold distance of a second autonomous vehicle, wherein the first autonomous vehicle transmits the first sequence of first pulses and the second sequence of second pulses in accordance with a first order, and wherein the second autonomous vehicle transmits the first sequence of first pulses and the second sequence of second pulses in accordance with a second order different from the first order, wherein the first autonomous vehicle and the second autonomous vehicle transmit the pulse sequences using a same set of center frequencies in the first order and the second order respectively.

2. The method of claim 1, wherein the resolution of the estimated range is less than or equal to 7.5 centimeters, and wherein bandwidths of the first frequency band and the second frequency band are less than 2 GHZ.

3. A radar system comprising:

a first transmit antenna that transmits, toward a target, a first plurality of first pulses within a first frequency band, wherein the first pulses in the first sequence are encoded according to a first Barker code;

a second transmit antenna that transmits, toward the target, a second plurality of second pulses within a second frequency band, wherein the second pulses in the second sequence are encoded according to a second Barker code, wherein the first transmit antenna and the second transmit antenna transmit the first pulses and second pulses at different times, and wherein the first frequency band and the second frequency band are different;

an analog-to-digital converter (ADC) that receives an analog signal that is indicative of a radar return received from the target, the radar return based upon a radar signal reflecting from the target, the ADC configured to digitally sample the analog signal to generate radar data that is indicative of the radar return; and a hardware logic component that is configured to perform acts comprising:

computing an estimated range to the target based upon the radar data, wherein the estimated range has a resolution that is based upon bandwidth of a third frequency band that includes the first frequency band the second frequency band, wherein an autonomous vehicle is navigated based in part on the estimated range, and wherein the radar data includes a first portion that is representative of a reflection of the first pulses from the target and a second portion that is representative of a reflection of the second pulses from the target, the acts further comprising:

concatenating a frequency domain representation of the first portion and a frequency domain representation of the second portion to generate a concatenated pulse sequence, and wherein computing the estimated range comprises computing an inverse fast Fourier transform (IFFT) over the concatenated pulse sequence, wherein computing the estimated range is based upon the IFFT, wherein the autonomous vehicle is a first autonomous vehicle operating within a threshold distance of a second autonomous vehicle, wherein the first autonomous vehicle transmits the first sequence of first pulses and the second sequence of second pulses in accordance with a first order, and wherein the second autonomous vehicle transmits the first sequence of first pulses and the second sequence of second pulses in accordance with a second order different from the first order, wherein the first autonomous vehicle and the second autonomous vehicle transmit the pulse sequences using a same set of center frequencies in the first order and the second order respectively.

4. The radar system of claim 3, wherein the resolution is less than or equal to 15 centimeters, and wherein a sampling rate of the ADC is less than or equal to 500 megasamples per second (MS/s).

5. The radar system of claim 4, wherein the first frequency band and the second frequency band have bandwidths less than or equal to 250 MHz.

6. The radar system of claim 3, wherein the resolution is less than or equal to 7.5 centimeters, and wherein a sampling rate of the ADC is less than or equal to 1 gigasamples per second (GS/s).

7. The radar system of claim 6, wherein the first frequency band and the second frequency band have bandwidths less than or equal to 500 MHz.

8. The radar system of claim 3, wherein the radar signal further comprises a third sequence of third pulses within a fourth frequency band, wherein the third pulses in the third sequence are encoded according to a third Barker code, wherein the third frequency band further includes the fourth frequency band.

9. The radar system of claim 8, wherein the first pulses, the second pulses, and the third pulses are transmitted in order of increasing frequency.

10. The radar system of claim 8, wherein the first pulses, the second pulses, and the third pulses are transmitted in order of decreasing frequency.

11. The radar system of claim 8, wherein the first pulses, the second pulses, and the third pulses are transmitted in random order.

12. The radar system of claim 3, wherein the radar data includes a first portion that is representative of a reflection of the first pulses from the target and a second portion that is representative of a reflection of the second pulses from the target, the acts further comprising:

prior to computing the estimated range, applying a first matched filter to the first portion of the radar data, the first matched filter based upon the first pulses; and prior to computing the estimated range, applying a second matched filter to the second portion of the radar data, the second matched filter based upon the second pulses.

13. The radar system of claim 3, wherein the radar system is configured for phase-modulated continuous wave (PMCW) operation.

14. A radar system comprising:

a first transmit antenna; a second transmit antenna;

a receive antenna; and a hardware logic component that is configured to perform acts comprising:

causing the first transmit antenna to transmit, toward a target, a first sequence of first pulses within a first frequency band, wherein the first pulses in the first sequence are encoded according to a first Barker code;

causing the second transmit antenna to transmit, toward the target, a second sequence of second pulses within a second frequency band, wherein the second pulses in the second sequence are encoded according to a second Barker code, wherein the first transmit antenna and the second transmit antenna transmit the first pulses and second pulses at different times, and wherein the first frequency band and the second frequency band are different;

responsive to receiving a return of the radar signal from the target by way of the receive antenna, computing an estimated range to the target based upon the first pulses and the second pulses, wherein the estimated range has a resolution that is based upon bandwidth of a third frequency band that includes the first frequency band and the second frequency band, wherein a frequency domain representation of the first pulses and a frequency domain representation of the second pulses are concatenated to generate a concatenated pulse sequence, wherein computing the estimated range comprises computing an inverse fast Fourier transform (IFFT) over the concatenated pulse sequence, wherein computing the estimated range is based upon the IFFT; and navigating an autonomous vehicle based in part on the estimated range, wherein the autonomous vehicle is a first autonomous vehicle operating within a threshold distance of a second autonomous vehicle, wherein the first autonomous vehicle transmits the first sequence of first pulses and the second sequence of second pulses in accordance with a first order, and wherein the second autonomous vehicle transmits the first sequence of first pulses and the second sequence of second pulses in accordance with a second order different from the first order, wherein the first autonomous vehicle and the second autonomous vehicle transmit the pulse sequences using a same set of center frequencies in the first order and the second order respectively.

15. The radar system of claim 14, wherein causing the first transmit antenna and the second antenna to transmit the first sequence of first pulses and the second sequence of second pulses, respectively, comprises:

controlling a digital-to-analog converter (DAC) to output the first pulses and the second pulses; and shifting a center frequency of the second pulses such that the second pulses have a different center frequency than the first pulses.

16. The radar system of claim 15, wherein the DAC has a sampling rate that is less than the bandwidth of the third frequency band.

17. The radar system of claim 16 wherein the DAC has a sampling rate of less than or equal to 500 megasamples per second (MS/s).

18. The radar system of claim 14, wherein the resolution of the estimated range is less than or equal to 7.5 centimeters, and wherein bandwidths of the first frequency band and the second frequency band are less than or equal to 500 MHz.

* * * * *